(12) United States Patent
Reinecke

(10) Patent No.: US 11,723,309 B2
(45) Date of Patent: *Aug. 15, 2023

(54) SIDE SHAKE RATE BASED ON MACHINE THROUGHPUTS

(71) Applicant: CNH Industrial America LLC, New Holland, PA (US)

(72) Inventor: Clay A. Reinecke, Blue Grass, IA (US)

(73) Assignee: CNH Industrial America LLC, New Holland, PA (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/430,616

(22) Filed: Jun. 4, 2019

(65) Prior Publication Data

US 2019/0281762 A1    Sep. 19, 2019

Related U.S. Application Data

(63) Continuation of application No. 15/240,206, filed on Aug. 18, 2016, now Pat. No. 10,334,781.

(Continued)

(51) Int. Cl.
*A01D 41/127* (2006.01)
*A01F 12/44* (2006.01)

(52) U.S. Cl.
CPC ........ *A01D 41/1276* (2013.01); *A01F 12/448* (2013.01)

(58) Field of Classification Search
CPC .......................... A01D 41/1276; A01F 12/448
See application file for complete search history.

(56) References Cited

U.S. PATENT DOCUMENTS 3,618,617 A * 11/1971 Gates .................. A01D 45/006
460/146
3,633,677 A * 1/1972 Walker ................ A01D 45/006
171/14

(Continued)

FOREIGN PATENT DOCUMENTS

AU        2014274655 B2 *  6/2017   ............. A01D 34/02
BE   WO 2017/040252 A1 *  3/2017

(Continued)

OTHER PUBLICATIONS

Mechatronic systems, communication, and control in precision agriculture; J. De Baerdemaeker, A. Munack, H. Ramon. H. Speckmann; IEEE Control Systems (vol. 21, Issue: 5, pp. 48-70).*

(Continued)

*Primary Examiner* — Khoi H Tran
*Assistant Examiner* — Jorge O Peche
(74) *Attorney, Agent, or Firm* — Peter Zacharias

(57) ABSTRACT

An agricultural harvester has a chassis carrying a header for gathering a crop. The header is removably attached to a feeder housing for feeding the crop into the agricultural harvester to be processed. A threshing and separating system is connected to the feeder housing for separating grain from Material Other than Grain (MOG). A grain cleaning system is connected to the threshing and separating system for further cleaning the separated grain. The grain cleaning system has at least one sieve operable to oscillate fore and aft and a side shaker mechanism operable to produce a side to side shaking motion in the at least one sieve. A control system is connected to the side shaker mechanism and operable to automatically proportionately increase an amount of the side to side shaking motion as a function of an amount and type of crop being processed.

18 Claims, 3 Drawing Sheets

Related U.S. Application Data

(60) Provisional application No. 62/207,766, filed on Aug. 20, 2015.

(56) References Cited

U.S. PATENT DOCUMENTS

| | | | | |
|---|---|---|---|---|
| 3,666,017 | A * | 5/1972 | Gates | A01D 45/006 171/27 |
| 3,897,332 | A * | 7/1975 | Delfosse | A01F 12/305 209/616 |
| 4,305,407 | A * | 12/1981 | De Coene | A01F 12/442 460/107 |
| 4,310,005 | A * | 1/1982 | De Busscher | A01F 12/442 460/73 |
| 4,332,262 | A * | 6/1982 | De Busscher | A01F 12/442 460/75 |
| 4,378,024 | A * | 3/1983 | De Busscher | A01F 12/442 460/73 |
| 4,465,081 | A * | 8/1984 | Decoene | A01F 12/442 460/98 |
| 4,475,561 | A * | 10/1984 | Decoene | A01F 12/442 460/98 |
| 4,510,946 | A * | 4/1985 | Decoene | A01F 12/442 460/98 |
| 4,517,792 | A * | 5/1985 | Denning | A01D 41/1273 56/DIG. 15 |
| 4,548,214 | A * | 10/1985 | Sheehan | A01D 75/282 460/9 |
| 4,557,276 | A * | 12/1985 | Hyman | A01D 75/282 209/416 |
| 4,712,568 | A * | 12/1987 | Strong | A01F 12/448 460/109 |
| 4,897,071 | A * | 1/1990 | Desnijder | A01D 75/282 460/10 |
| 4,957,467 | A * | 9/1990 | Zachary | A01F 12/442 460/84 |
| 4,994,286 | A * | 2/1991 | Greer | A23N 17/00 426/507 |
| 5,041,059 | A * | 8/1991 | Ricketts | A01F 12/446 460/902 |
| 5,085,616 | A * | 2/1992 | Matousek | A01F 12/44 209/394 |
| 5,176,574 | A * | 1/1993 | Matousek | A01F 12/446 460/902 |
| 5,343,761 | A * | 9/1994 | Myers | G01F 1/206 73/861.73 |
| 5,525,108 | A * | 6/1996 | Rouse | A01F 12/448 460/101 |
| 6,119,442 | A * | 9/2000 | Hale | A01D 41/127 56/10.2 H |
| 6,732,667 | B1 * | 5/2004 | Wilson | A01C 7/102 177/139 |
| 6,922,983 | B2 * | 8/2005 | Gryspeerdt | A01D 61/008 198/638 |
| 7,048,627 | B2 | 5/2006 | Fechner et al. | |
| 7,357,711 | B1 * | 4/2008 | Matousek | A01F 12/446 209/408 |
| 8,880,299 | B2 | 11/2014 | Murray et al. | |
| 9,232,694 | B2 | 1/2016 | Murray et al. | |
| 9,699,970 | B2 * | 7/2017 | Johnson | A01D 41/1273 |
| 9,968,036 | B2 * | 5/2018 | Johnson | A01D 41/1273 |
| 2001/0039202 | A1 * | 11/2001 | Brantley | A01D 45/22 171/58 |
| 2002/0086722 | A1 * | 7/2002 | Kuhn | A01F 12/444 460/99 |
| 2002/0155867 | A1 * | 10/2002 | Visagie | A01F 12/442 460/70 |
| 2003/0140612 | A1 * | 7/2003 | Gorden | A01F 12/446 460/99 |
| 2004/0226275 | A1 * | 11/2004 | Baumgarten | A01F 12/448 56/153 |
| 2005/0020333 | A1 * | 1/2005 | Sahr | A01F 12/52 460/114 |
| 2006/0270473 | A1 * | 11/2006 | Straeter | A01D 75/282 460/99 |
| 2007/0056258 | A1 * | 3/2007 | Behnke | A01D 41/1277 56/10.2 R |
| 2007/0204590 | A1 * | 9/2007 | Straeter | A01D 75/282 56/303 |
| 2010/0016044 | A1 * | 1/2010 | Adamson | A01D 75/282 460/1 |
| 2012/0267915 | A1 * | 10/2012 | Ringer | A01M 7/00 296/190.08 |
| 2013/0158816 | A1 * | 6/2013 | Murray | A01F 12/448 701/50 |
| 2014/0028117 | A1 * | 1/2014 | Bucinskas | H02K 44/00 310/11 |
| 2014/0171163 | A1 * | 6/2014 | Murray | A01F 12/448 460/101 |
| 2014/0179381 | A1 * | 6/2014 | Murray | A01F 12/448 460/101 |
| 2015/0080069 | A1 * | 3/2015 | Fuchs | A01D 41/1272 460/1 |
| 2015/0080070 | A1 * | 3/2015 | Johnson | A01D 41/1273 460/5 |
| 2015/0105984 | A1 * | 4/2015 | Birrell | A01D 41/127 701/50 |
| 2015/0124054 | A1 * | 5/2015 | Darr | G01F 25/0084 348/46 |
| 2016/0071410 | A1 * | 3/2016 | Rupp | H04W 4/70 701/50 |
| 2016/0084813 | A1 * | 3/2016 | Anderson | G01N 33/025 702/5 |
| 2016/0084987 | A1 * | 3/2016 | Dybro | G01B 21/22 702/5 |
| 2016/0088794 | A1 | 3/2016 | Baumgarten et al. | |
| 2016/0106040 | A1 * | 4/2016 | Biggerstaff | A01D 41/1243 460/112 |
| 2016/0302351 | A1 * | 10/2016 | Schildroth | B64C 39/024 |
| 2017/0089742 | A1 * | 3/2017 | Bruns | A01D 41/1273 |
| 2017/0112061 | A1 * | 4/2017 | Meyer | G06F 3/0482 |
| 2017/0115862 | A1 * | 4/2017 | Stratton | A01D 41/1277 |
| 2017/0265397 | A1 * | 9/2017 | Johnson | A01F 12/448 |
| 2019/0069470 | A1 * | 3/2019 | Pfeiffer | A01B 79/005 |
| 2019/0254220 | A1 * | 8/2019 | Bertino | A01D 67/00 |
| 2021/0105941 | A1 * | 4/2021 | Yu | G01S 13/87 |
| 2021/0120737 | A1 * | 4/2021 | Wang | G06T 7/0004 |
| 2021/0209269 | A1 * | 7/2021 | Sauder | A01D 34/008 |
| 2022/0132723 | A1 * | 5/2022 | Anderson | A01B 79/005 701/25 |
| 2022/0132736 | A1 * | 5/2022 | Meyers | A01D 41/1273 460/7 |
| 2022/0304232 | A1 * | 9/2022 | Korman | A01D 43/085 |
| 2022/0374026 | A1 * | 11/2022 | Vougioukas | G05D 1/0274 |
| 2022/0408643 | A1 * | 12/2022 | Somarowthu | G01N 21/3581 |

FOREIGN PATENT DOCUMENTS

| | | | | |
|---|---|---|---|---|
| BE | 3158854 | A1 * | 4/2017 | |
| BE | 3275304 | A1 * | 1/2018 | |
| BR | 102016019385 | A2 * | 2/2017 | A01D 41/1276 |
| CN | 203675614 | U * | 7/2014 | |
| CN | 106612901 | A * | 5/2017 | |
| CN | 106659125 | A * | 5/2017 | A01D 41/1277 |
| CN | 206136669 | U * | 5/2017 | |
| CN | 107597552 | A * | 1/2018 | |
| CN | 108738731 | A * | 11/2018 | |
| CN | 208338350 | U * | 1/2019 | |
| CN | 110391767 | A * | 10/2019 | H02N 2/185 |
| CN | 114080152 | A * | 2/2022 | |
| DE | 102004023767 | | 11/2005 | |
| DE | 102004023767 | A1 * | 11/2005 | A01D 41/1276 |
| DE | 102013112080 | A1 * | 5/2015 | A01D 43/087 |
| EP | 1584225 | | 10/2005 | |
| EP | 1609352 | | 12/2005 | |
| EP | 1712122 | A1 * | 10/2006 | A01D 75/282 |
| EP | 2057883 | A2 * | 5/2009 | A01D 43/085 |
| EP | 2401906 | A1 * | 1/2012 | A01D 41/127 |
| EP | 3132670 | A1 * | 2/2017 | A01D 41/1276 |
| EP | 3351084 | A1 * | 7/2018 | A01D 34/37 |

(56) References Cited

FOREIGN PATENT DOCUMENTS

| | | | | | |
|---|---|---|---|---|---|
| EP | 3794928 | A1 | * | 3/2021 | ......... A01D 41/1272 |
| GB | 2356546 | A | * | 5/2001 | ......... A01D 41/1271 |
| JP | H10191770 | A | * | 7/1998 | |
| KR | 102142736 | B1 | * | 8/2020 | |
| WO | WO-2020003882 | A1 | * | 1/2020 | ......... A01D 41/1272 |

OTHER PUBLICATIONS

European Search Report, 16185208.2-1656; dated Nov. 14, 2016.

* cited by examiner

SIDE SHAKE RATE BASED ON MACHINE THROUGHPUTS

The present application is a continuation of U.S. patent application Ser. No. 15/240,206, filed on Aug. 18, 2016, which, in turn, claims the right of priority to U.S. provisional patent application Ser. No. 62/207,766, entitled "SIDE SHAKE RATE BASED ON MACHINE THROUGHPUTS", filed Aug. 20, 2015, both of which are incorporated herein by reference.

BACKGROUND OF THE INVENTION

1. Field of the Invention

The present invention relates to agricultural harvesters such as combines, and, more particularly, to sieve assemblies incorporated in the harvester crop processing section having the capability for side to side shaking motion.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The upper sieve or sieve assembly is driven in fore and aft movement to move the harvested crop material in an aft direction and at the same time to separate the remaining grain or crop from the non-crop material. When the agricultural harvester is on the side of a slope, side to side movement of the sieve assembly is required so as to prevent downhill pooling of the material and resultant reduction in capacity and/or efficiency by evenly distributing the material across the sieve assembly. The side to side movement is used generally selectively so that the continuous primary movement is fore and aft. Further, the side to side movement is often adjustable in preset increments. For example, 3 millimeters of side to side movement per degree of lateral side slope inclination may be chosen as a recommended setting for small seeds. 2.5 millimeters per degree may be recommended for medium sized seeds. 2 millimeters per degree may be recommended for large sized seeds. These settings may be based on an assumption that the agricultural harvester will be operating at its maximum capacity for the crop being processed, limited by the power limit of the agricultural harvester. Alternately, the same settings may be used for all crops, irrespective of seed size.

However, in practice, it is often not feasible or necessary to continuously utilize these amounts of side to side movement of the sieve assembly, not only due to variations in the amount of side slope being experienced by the agricultural harvester, but also because the amount of crop being processed at a given moment may not require the maximum capacity of the agricultural harvester. Specifically, the amount of crop being processed may change as the agricultural harvester proceeds, as it passes through areas of greater or lesser yields.

In other words, a certain amount of side to side movement of the sieve assembly is necessary to prevent downhill pooling of the crop material and resultant reduction in capacity and/or efficiency at a given amount of side slope when the agricultural harvester is operating at its maximum capacity for the crop being processed. However, when the agricultural harvester is not in fact operating at its maximum capacity, continuous use of the amount of side to side movement necessary at maximum capacity results in unnecessary damage to components, including wear and tear on the sieve assembly and on the side shaker mechanism that is used to cause the side to side movement.

Accordingly, what is needed in the art is a system or method that automatically adjusts the amount of side to side shaking motion of the sieve assembly according to the amount of crop being processed at a given moment under a given amount of side slope.

SUMMARY OF THE INVENTION

The present invention provides such a way to automatically adjust the amount of side to side shaking motion of the sieve assembly of a cleaning system of an agricultural harvester based on the amount of crop being processed at a given moment under a given amount of side slope. In this way, the amount of side to side shaking motion is limited to only the amount necessary for the cleaning system to function properly, thereby limiting stress and damage to components, including wear and tear on the sieve assembly and on the side shaker mechanism that is used to cause the side to side movement.

The present invention may allow an operator to configure parameters of the proportionate calculation used to determine the amount of side to side shaking motion as a function of the amount of crop being processed. Alternately, the present invention may allow an operator to choose between predefined proportionate calculations. Still alternately, the proportionate calculation may use a pre-configured algorithm set by the manufacturer of the agricultural harvester, according to the results of functional testing. The present invention may utilize a linearly proportionate relationship between the amount of crop being processed and the amount of side to side shaking motion, or may utilize a non-linear proportionate relationship between the amount of crop being processed and the amount of side to side shaking motion.

In one form, the invention is directed to an agricultural harvester having a chassis carrying a header for gathering a crop. The header is removably attached to a feeder housing for feeding the crop into the agricultural harvester to be processed. A threshing and separating system is connected to the feeder housing for separating grain from Material Other than Grain (MOG). A grain cleaning system is connected to the threshing and separating system for further cleaning the separated grain. The grain cleaning system has at least one sieve operable to oscillate fore and aft and a side shaker mechanism operable to produce a side to side shaking motion in the at least one sieve. A control system is connected to the side shaker mechanism and operable to automatically proportionately increase an amount of the side to side shaking motion as a function of an amount of crop being processed.

In another form, the invention is directed to a control system for an agricultural harvester. The agricultural harvester has a chassis carrying a header for gathering a crop. The header is removably attached to a feeder housing for feeding the crop into the agricultural harvester. A threshing and separating system is connected to the feeder housing for separating grain from MOG. A grain cleaning system is connected to the threshing and separating system for further cleaning the separated grain. The grain cleaning system has at least one sieve operable to oscillate fore and aft and a side shaker mechanism operable to produce a side to side shaking motion in the at least one sieve. The control system is connected to the side shaker mechanism and is operable to automatically proportionately increase an amount of the side to side shaking motion as a function of an amount of crop being processed.

In another form, the invention is directed to a method of controlling an agricultural harvester. The agricultural harvester has a chassis carrying a header for gathering a crop. The header is removably attached to a feeder housing for feeding the crop into the agricultural harvester. A threshing and separating system is connected to the feeder housing for separating grain from MOG. A grain cleaning system is connected to the threshing and separating system for further cleaning the separated grain. The grain cleaning system has at least one sieve being operable to oscillate fore and aft and a side shaker mechanism operable to produce a side to side shaking motion in the at least one sieve. The method includes several steps. The first step is providing a control system connected to the side shaker mechanism. The second step is automatically proportionately increasing an amount of the side to side shaking motion as a function of an amount of crop being processed.

An advantage of the present invention is that it takes into account the specific requirements of the amount of crop being processed by the cleaning system in terms of the amount of side to side shaking motion that is required in the sieve assembly in order to prevent downhill pooling of the crop material and reduction in capacity and/or efficiency as a result of side slope. Another advantage of the present invention is that it minimizes the use of side to side shaking motion of the sieve assembly to an effective amount, in order to reduce unnecessary wear and tear on mechanical components.

Another advantage of the present invention is that it does not rely on the operator to determine the needed settings of side to side shaking motion required in the sieve assembly as a function of the amount of crop being processed or as a function of side slope.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
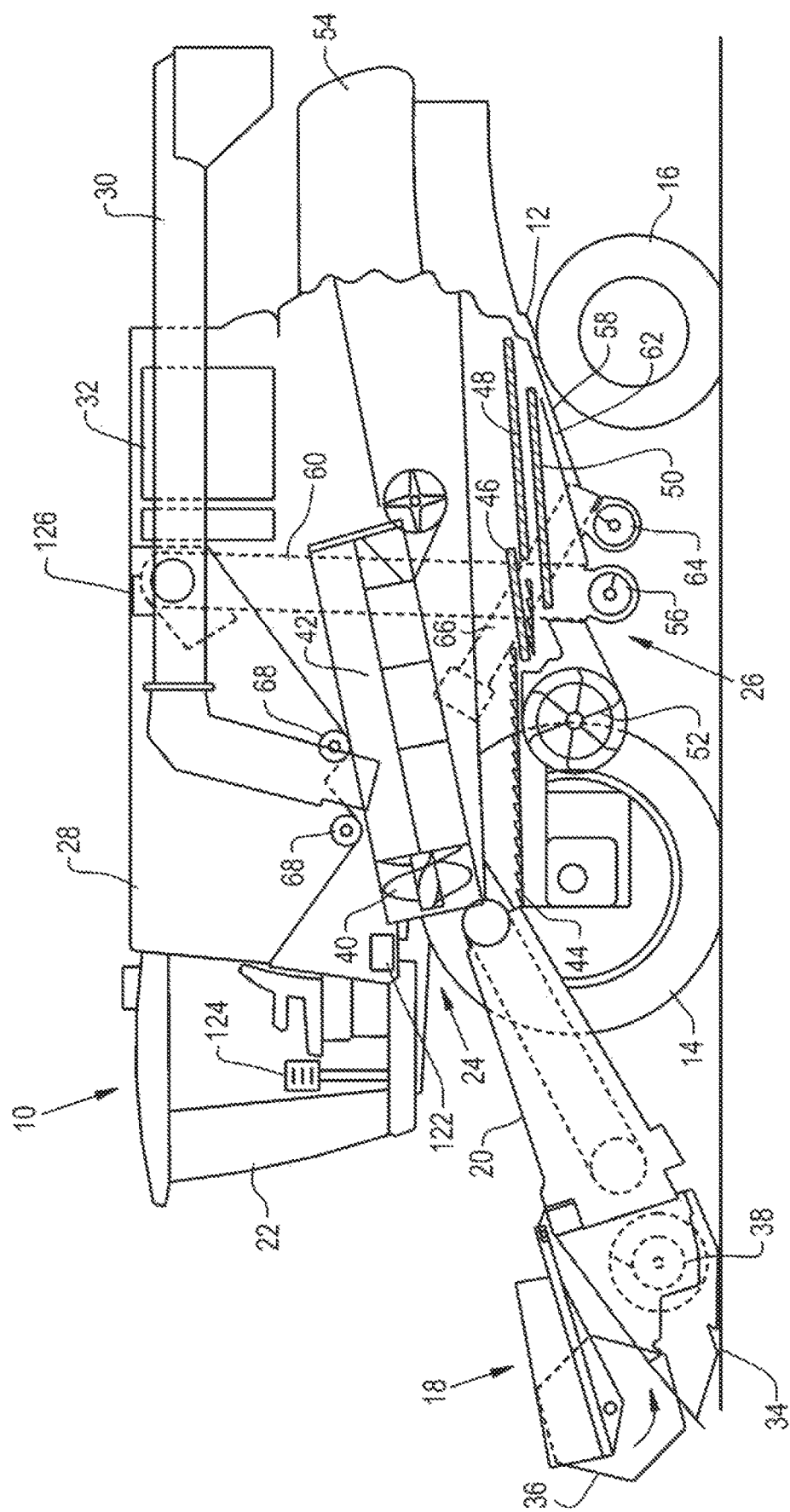
FIG. 1 is a side view of an embodiment of an agricultural harvester in the form of a combine which includes an embodiment of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30. The combine 10 is provided with a control system 122 and a combine monitor 124.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative, to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10. A yield monitor 126 may monitor the flow of grain proceeding from the cleaning system 26 into the grain tank 28, and may be connected to the control system 122 and/or to the combine monitor 124.

Figure 2:
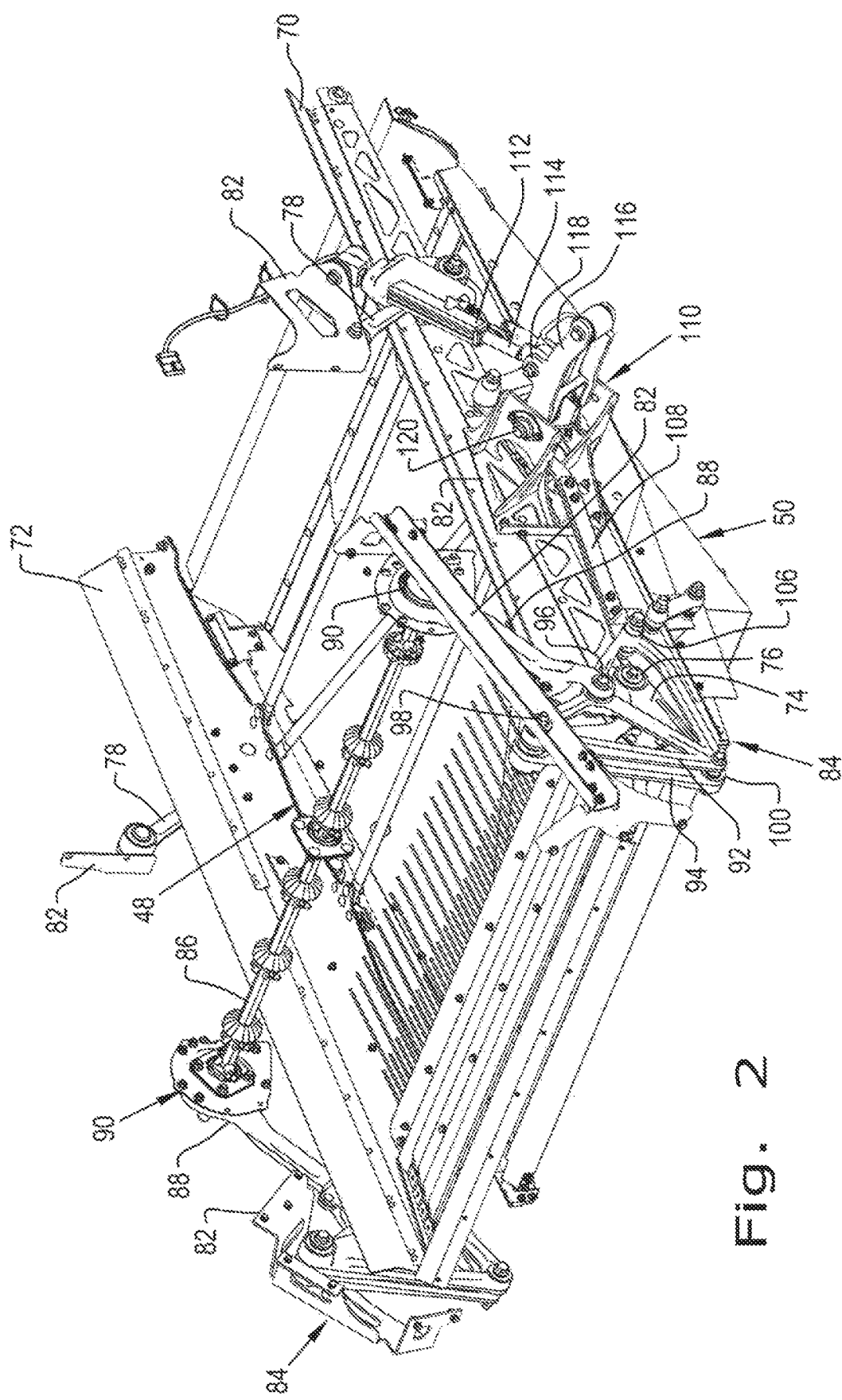
FIG. 2 is a perspective view of a sieve assembly used in an embodiment of the present invention.

Referring now to FIG. 2, the upper and lower sieves or sieve assemblies 48 and 50 are shown. The upper sieve assembly 48 includes a left rail or frame 70 and a right rail or frame 72 interconnected by a cross frame 74. The right and left frames 70 and 72 are supported at the cross frame 74 by a front pivot support 76. A flexible link 78 connects to a rear support to maintain the rear of the rails in place. Support frames 82 provide a base affixed to the chassis 12 to provide ultimate support for the sieve assembly 48. A sieve extends between right and left frames 70 and 72 to provide a surface for carrying material in an aft direction and permit grain or other crop material to drop through and be collected. The sieve is not shown to enable a clearer description of the present invention.

The front of the right and left frames 70 and 72 are mounted for fore and aft movement through a fore and aft oscillation mechanism generally indicated at 84. An input drive shaft 86 extending transverse in chassis 12 receives a suitable power input for rotation. Both ends of drive shaft drive 86 reciprocate arms 88 through eccentric mountings 90. Arm 88 connects to a first frame 92 through a pivotal connection 96. A pivotal mounting 98 supported by frame 82 mounts the first frame 92 and a second frame 94 adjacent to it in radially inward from the first frame 92. A frame interconnection 100 connects the first and second frames 92 and 94. A pivotal connection 106 on first frame 92 connects with a link 108 that drives the lower sieve 50 for reciprocating movement.

The right and left frames 70 and 72 are selectively reciprocated from side to side by a side shaker mechanism generally indicated at 110. The mechanism includes a reciprocating electric actuator 112 appropriately mounted to frame 82 and having an output shaft 114 connecting to a linkage 116 by a pivotal input connection 118. The linkage 116 is pivotally connected to the frame 82 at 120, and serves to translate the reciprocating motion of the reciprocating electric actuator 112 into side to side shaking motion of the upper sieve 48 and lower sieve 50.

The amount of side to side shaking motion of the upper sieve 48 and lower sieve 50 produced by the side shaker mechanism 110 may be varied by the control system 122 of the combine 10. Generally, it is desirable to utilize the minimum amount of side to side shaking motion for a given degree of side slope on which the combine 10 is situated that will still allow the upper sieve 48 and lower sieve 50 of the cleaning system 26 to function properly, due to increased accelerations and forces in the cleaning system 26, which lead to faster degradation of machine components. Also, by using less side to side shaking motion per degree of incline, the side shaker mechanism 110 will accommodate steeper side slopes, due to the finite space available between either side of the sieve assembly 48 and the chassis 12.

Figure 3:
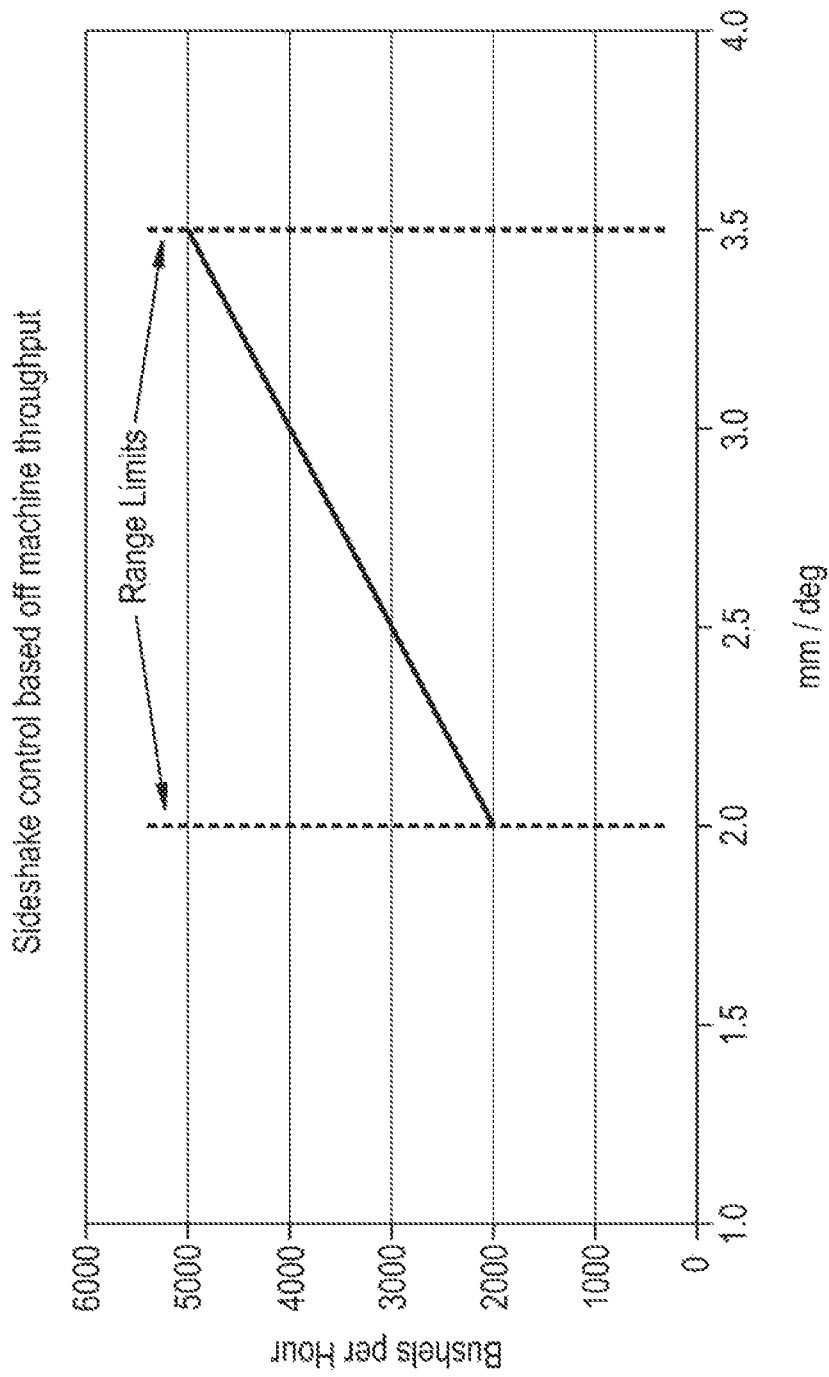
FIG. 3 is graphic representation of a proportionate calculation used by an embodiment of the present invention.

This side to side shaking motion is measured in millimeters of sideways motion per degree (mm/deg) of lateral side slope inclination of the upper sieve 48 and lower sieve 50 of the cleaning system 26. In order to utilize a minimum amount of this side to side shaking motion for a given degree of side slope on which the combine 10 is situated that will still allow the upper sieve 48 and lower sieve 50 of the cleaning system 26 to function properly, the control system 122 may utilize the yield monitor 126 to determine the current amount of crop being processed by the cleaning system 26 of the combine 10. As shown in FIG. 3, the control system 122 then uses a proportionate calculation within range limits to automatically adjust the amount of side to side shaking motion of the cleaning system 26 as a function of the amount of crop being processed.

In the example shown in FIG. 3, the control system 122 is configured to utilize a minimum of 2.0 mm/deg of side to side shaking motion up to 2000 bushels per hour of crop being processed by the cleaning system 26 of the combine 10. As the amount of crop being processed increases, the control system 122 increases the side to side shaking motion at a rate of 0.5 mm/deg per thousand bushels per hour, up to a maximum of 3.5 mm/deg at 5000 bushels per hour. Further, the parameters of the proportionate calculation may be fully configurable by the operator of the combine 10, using the combine monitor 124 connected to the control system 122, or by way of other input device, such as a rotatable knob (not shown).

Configurable parameters of the proportionate calculation may include the minimum amount of side to side shaking motion, the maximum amount of side to side shaking motion, the amount of crop being processed at which the amount of side to side shaking motion is to begin to increase, the amount of crop being processed at which the amount of side to side shaking motion is to stop increasing, and/or the slope of the line representing the proportion between the amount of crop being processed and the amount of side to side shaking. The range limits may or may not remain constant for different types of crops or grains, although the throughput of the agricultural harvester in bushels per hour continues to change, so that the slope of the line representing the proportion between the amount of crop being processed and the amount of side to side shaking may change. In other words, the proportionate calculation may depend upon or be specific to crop type.

In the case of a simplified input, the selection may be made by an operator between predefined proportionate calculations. For example, a "trim" knob (not shown) may be placed in the cab 22 of the combine 10 that controls how aggressive the side to side shaking motion is, so that, for example, a "low" setting may result in a minimum of 1.0 mm/deg of side to side shaking motion up to 1000 bushels per hour and a maximum of 2.5 mm/deg of side to side shaking motion at 4000 bushels per hour. A "medium" setting would then result in a minimum of 1.5 mm/deg of side to side shaking motion up to 1500 bushels per hour and a maximum of 3.0 mm/deg of side to side shaking motion at 4500 bushels per hour. A "high" setting, would result in the settings as shown in FIG. 3. These "low", "medium", and "high" parameters are exemplary, and could be chosen otherwise. Further, the slope of the line representing the proportion between the amount of crop being processed and the amount of side to side shaking may be flatter or steeper within the same mm/deg limits. Additionally, the proportionate calculation may be linear or non-linear, so that the slope of the line may increase or decrease as the amount of crop being processed increases.

The amount of side to side shaking motion may then be further adjusted by the control system 122 according the amount of side slope on which the combine 10 is currently situated, incrementally or continuously.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cleaning system for an agricultural harvester, the cleaning system comprising:
   at least one sieve operable to oscillate fore and aft;
   a side shaker mechanism coupled to the at least one sieve, the side shaker mechanism operable to produce a side-to-side shaking motion in the at least one sieve;
   a sensor positioned downstream of the cleaning system, as viewed in a direction of crop flow, and configured to provide sensor feedback associated with an overall amount of crop outputted by the cleaning system; and
   a control system configured to automatically control an operation of the side shaker mechanism to adjust an amount of the side-to-side shaking motion of the at least one sieve,
   wherein the control system is configured to automatically increase an amount of said side to side shaking motion as a function of an overall amount and type of crop being outputted, and wherein the control system is configured to adjust the amount of side-to-side shaking motion based at least in part on the sensor feedback associated with the overall amount of crop being outputted by the cleaning system;
   wherein said control system is operable to automatically proportionately increase the amount of said side-to-side shaking motion, and wherein said automatic proportionate increase of said amount of said side-to-side shaking motion is one of linear and non-linear.

2. The cleaning system of claim 1, wherein the sensor forms part of a yield monitor in communication with the control system.

3. The cleaning system of claim 1, wherein the control system is configured to proportionally increase the amount of side-to-side shaking motion when an increase in the overall amount of crop being outputted by the cleaning system is identified.

4. The cleaning system of claim 1, wherein the control system is configured to proportionally decrease the amount of side-to-side shaking motion when a decrease in the overall amount of crop being outputted by the cleaning system is identified.

5. The cleaning system of claim 1, wherein the control system is operable to adjust the amount of side-to-side shaking motion based on both the overall amount of crop being outputted by the cleaning system and an amount of side slope associated with the at least one sieve.

6. The cleaning system of claim 1, wherein the control system is configured to receive an input from an operator associated with a selection of a configurable parameter related to the adjustment of the amount of side-to-side shaking motion.

7. The cleaning system of claim 6, wherein the configurable parameter comprises at least one of:
   a minimum amount of the side-to-side shaking motion;
   a maximum amount of the side-to-side shaking motion;
   a threshold value for the overall amount of crop being outputted by the cleaning system at which the control system should begin to increase the amount of side-to-side shaking motion;
   a threshold value for the overall amount of crop being outputted by the cleaning system at which the control system stops increasing the amount of side-to-side shaking motion; or a proportion between the amount of side-to-side shaking motion and the overall amount of crop being outputted by the cleaning system.

8. The cleaning system of claim 1, wherein the control system is configured to adjust the amount of side-to-side shaking motion based at least in part on the sensor feedback associated with the overall rate of crop being outputted by the cleaning system.

9. The cleaning system of claim 1, wherein the sensor is positioned outside of the cleaning system.

10. A method for operating a cleaning system of an agricultural harvester, the cleaning system including at least one sieve operable to oscillate fore and aft, and a side shaker mechanism coupled to the at least one sieve, the side shaker mechanism operable to produce a side-to-side shaking motion in the at least one sieve, the method comprising:
   receiving, with a control system, an input indicative of an overall amount of crop being outputted by the cleaning system;
   automatically controlling, with the control system, an operation of the side shaker mechanism to adjust the amount of the side-to-side shaking motion of the at least one sieve based at least in part on the overall amount of crop being outputted by the cleaning system; and
   monitoring the overall amount of crop being outputted by the cleaning system using a sensor that is positioned downstream of the cleaning system, as viewed in a direction of crop flow, and provides sensor feedback associated with the overall amount of crop outputted by the cleaning system, the monitoring step being performed to identify a change in the overall amount of crop being outputted;
   wherein automatically controlling the operation of the side shaker mechanism comprises automatically controlling the operation of the side shaker mechanism to adjust the amount of side-to-side shaking motion as a function of the overall amount of crop being outputted by the cleaning system, wherein the control system is configured to automatically increase an amount of said side to side shaking motion as a function of an overall amount and type of crop being outputted, and wherein receiving the input comprises receiving the sensor feedback associated with the overall amount of crop being outputted by the cleaning system;
   wherein said control system is operable to automatically proportionately increase the amount of said side-to-side shaking motion, and wherein said automatic proportionate increase of said amount of said side-to-side shaking motion is one of linear and non-linear.

11. The method of claim 10, wherein the sensor forms part of a yield monitor in communication with the control system.

12. The method of claim 10, wherein automatically controlling the operation of the side shaker comprises automatically controlling the operation of the side shaker to proportionally increase the amount of side-to-side shaking motion when an increase in the overall amount of crop being outputted by the cleaning system is identified.

13. The method of claim 10, wherein automatically controlling the operation of the side shaker comprises automatically controlling the operation of the side shaker to proportionally decrease the amount of side-to-side shaking motion when a decrease in the overall amount of crop being outputted by the cleaning system is identified.

14. The method of claim 10, wherein automatically controlling the operation of the side shaker comprises automatically controlling the operation of the side shaker to adjust the amount of the side-to-side shaking motion of the at least one sieve based on both the overall amount of crop being outputted by the cleaning system and an amount of side slope associated with the at least one sieve.

15. The method of claim 10, further comprising receiving, with the control system, an operator input associated with a selection of a configurable parameter related to the adjustment of the amount of side-to-side shaking motion.

16. The method of claim 15, wherein the configurable parameter comprises at least one of:
   a minimum amount of the side-to-side shaking motion;
   a maximum amount of the side-to-side shaking motion;
   a threshold value for the overall amount of crop being outputted by the cleaning system at which the control system should begin to increase the amount of side-to-side shaking motion;
   a threshold value for the overall amount of crop being outputted by the cleaning system at which the control system stops increasing the amount of side-to-side shaking motion; or
   a proportion between the amount of side-to-side shaking motion and the overall amount of crop being outputted by the cleaning system.

17. The method of claim 10, wherein automatically controlling the operation of the side shaker mechanism comprises automatically controlling the operation of the side shaker mechanism to adjust the amount of side-to-side shaking motion as a function of the overall rate of crop being outputted by the cleaning system.

18. The method of claim 10, wherein the sensor is positioned outside of the cleaning system.

\* \* \* \* \*